United States Patent
Le Huerou et al.

(10) Patent No.: US 8,929,527 B2
(45) Date of Patent: Jan. 6, 2015

(54) METHOD ALLOWING AN EXCHANGE OF CONTEXT INFORMATION WITHIN A GROUP OF USERS SHARING ONE AND THE SAME IDENTIFIER

(75) Inventors: Emmanuel Le Huerou, Saint Quay Perros (FR); Eric Beaufils, Langoat (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 13/876,714

(22) PCT Filed: Sep. 27, 2011

(86) PCT No.: PCT/FR2011/052251
§ 371 (c)(1),
(2), (4) Date: Jun. 18, 2013

(87) PCT Pub. No.: WO2012/042165
PCT Pub. Date: Apr. 5, 2012

(65) Prior Publication Data
US 2013/0322611 A1   Dec. 5, 2013

(30) Foreign Application Priority Data
Sep. 28, 2010 (FR) .................................. 10 57820

(51) Int. Cl.
*H04M 1/00* (2006.01)
*H04M 3/42* (2006.01)
*H04M 3/46* (2006.01)
*H04M 3/533* (2006.01)

(52) U.S. Cl.
CPC .......... *H04M 3/42365* (2013.01); *H04M 3/465* (2013.01); *H04M 3/53308* (2013.01); *H04M 2201/38* (2013.01)
USPC ..................................... 379/156; 379/211.01

(58) Field of Classification Search
USPC ......... 379/142.12, 156, 159, 177, 184, 201.1, 379/211.01
See application file for complete search history.

(56) References Cited

U.S. PATENT DOCUMENTS 6,393,275 B1 *   5/2002   Alfred ........................ 455/422.1
6,721,412 B1 *   4/2004   Youngs .................... 379/204.01
(Continued)

FOREIGN PATENT DOCUMENTS

WO     2007148037 A1    12/2007

OTHER PUBLICATIONS

International Search Report dated Jan. 4, 2012 for corresponding International Application No. PCT/FR2011/052251, filed on Sep. 27, 2011.

(Continued)

*Primary Examiner* — Quoc D Tran
(74) *Attorney, Agent, or Firm* — David D. Brush; Westman, Champlin & Koehler, P.A.

(57) ABSTRACT

A method is provided for allowing an exchange of context information within a group of users sharing one and the same identifier. The method includes transmitting information between at least one first terminal and a second terminal associated with a common identifier. The method includes a step of sending by the first terminal a notification of state intended at least for the second terminal and carrying an item of information relating to the context in which a user of the first terminal finds himself. The method allows members of a community of users, which is identified by a unique telephone number, to avail themselves of context information relating to the other members of the community at any moment, and in particular at the precise moment at which a setup request for establishing a communication is presented to them.

6 Claims, 2 Drawing Sheets

(56) References Cited

U.S. PATENT DOCUMENTS 6,873,700 B2* 3/2005 Kim ............................ 379/233
2005/0238157 A1* 10/2005 Shaffer et al. ............ 379/211.01

OTHER PUBLICATIONS

International Preliminary Report on Patentability and English translation of the Written Opinion dated Apr. 2, 2013 for corresponding International Application No. PCT/FR2011/052251, filed Sep. 27, 2011.

French Search Report and Written Opinion dated Jun. 28, 2013 for corresponding French Application No. FR 1057820, filed Sep. 28, 2010.

* cited by examiner

US 8,929,527 B2

METHOD ALLOWING AN EXCHANGE OF CONTEXT INFORMATION WITHIN A GROUP OF USERS SHARING ONE AND THE SAME IDENTIFIER

CROSS-REFERENCE TO RELATED APPLICATIONS

This Application is a Section 371 National Stage Application of International Application No. PCT/FR2011/052251, filed Sep. 27, 2011, which is incorporated by reference in its entirety and published as WO 2012/042165 on Apr. 5, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure pertains to a method for transmitting information between at least one first terminal and one second terminal associated with a common identifier.

Such methods are commonly used in the field of interpersonal communications; especially telephone communications.

BACKGROUND OF THE DISCLOSURE

The current state of the art enables the connecting of a plurality of terminals to a same telephone line having one of its termination points localized in a family home. In such situations, an occupant of the home can get a fairly precise idea of the availability of the other occupants by looking the activities of those who are in his field of vision and listening to and/or verbally questioning those whom he cannot see. He will thus know which occupants are available for a conversation or to perform any other kind of common activity such watching an audiovisual program or playing a video game.

Now, at present in the field of telecommunications, there is an increasingly pronounced interest in the sharing of experiences in communities. This has led certain telecommunications operators to propose single-number services through which a community of users is identified by a single telephone number which is then common to all the users of the community, each user being provided with a portable terminal. In this type of situation, the different members of the community are most often situated at several kilometers or even tens or hundreds of kilometers from each other and are therefore not only unable to see each other but are also incapable of making verbal exchanges of information on their activity and availability, so that the different members of the community do not have information available, in their current one-number services, on the state and availability of the other members of the community. This limits the utility of this type of service and therefore hampers its development.

Moreover, when a communication is presented to the members of a community sharing a same identifier, each of said members must determine whether or not he has to agree to the setting up of the communication thus presented or on the contrary allow another member to take this communication, thus ultimately leading to a sub-optimal situation in which a member of the community picks up the communication before another member who is however the true intended recipient of the communication. It can even happen that none of the members will pick up the communication, each believing that one of the other members is better placed to do it, so that ultimately no communication is established.

SUMMARY

An exemplary embodiment of the invention pertains to a method for transmitting information between terminals among a plurality of terminals associated with a common identifier, characterized in that it includes a step for sending, through a first terminal, of a state notification intended for at least one second terminal and carrying a piece of information on the context in which a user of said first terminal is situated.

The state notifications could be exchanged directly between the different terminals associated with the same common identifier, each terminal sending a new state notification as soon as there is a change in its status or its context, for example if it is moved, if it enters into communication with a third party, if it is in a standby mode, or on the contrary reactive, etc.

Alternatively, the state notifications could be managed in a centralized manner by a management server which could then update a table of states of different members of the community. In such a mode of implementation, a method as described here above furthermore includes a step for the receiving of said notification by a management server and a step for re-transmitting said notification towards at least the second terminal.

According to another advantageous variant of the invention, the method described here above furthermore includes a step for presenting a communication to said first and second terminals and a step for sending, through the first terminal, a notification of choice intended for at least the second terminal and being a carrier of a piece of information relating to the communication presented.

Through an embodiment of this variant of the invention, the different users of the terminals associated with a same common identifier can exchange pieces of information with each other in order to determine the best response to be given to the presentation of the communication. A user could for example make it known to the others that he is too busy to take the communication while another could say that he does not to wish to speak to the caller identified on the screen of his terminal while yet another user could make it known to the others that he, on the contrary, absolutely wishes to take the communication, in which case the other users, informed in this way, will let him set up the communication.

According to one particular embodiment of the invention, the step for presenting the communication includes a presentation of a duration at the end of which said communication will be transferred to a messaging service.

This mode of implementation is advantageous in that it increases the chances that a communication presented to a group of users associated with a same identifier will be effectively set up. Indeed, it is well known, including to the users themselves, that the probability of a caller terminating an attempt to make a communication will increase very significantly when the communication is redirected to a messaging service because most callers generally give up the idea of leaving a message and hang up as soon as they hear a voice-mail greeting.

Thus, the presentation of the duration at the end of which the communication will be transferred to the messaging service acts as a countdown encouraging users to whom the communication is presented to accept the setting up of a communication, failing which it would be lost. This has the advantage of generally reducing the risks of loss of information useful to the users and loss of revenue for the operators if a communication does not go through.

According to another mode of implementation of the invention, which could be deployed as an alternative to or in addition to the previous one, a method such as the one described further above furthermore includes a step for detecting a designation, by a user of a terminal on which the communication is presented, of a user of another terminal, said notification of choice then including a command designed to cause the terminal of the designated user to produce a predetermined stimulus.

According to a hardware aspect, an embodiment of the invention also pertains to a telecommunications system including at least one first terminal and one second terminal associated with a common identifier, characterized in that at least the first terminal includes means for sending a state notification intended for at least the second terminal and carrying a piece of information relating to the context in which a user of said first terminal is situated.

According to another hardware aspect, an embodiment of the invention also pertains to a communications terminal associated with an identifier common to at least one second terminal, characterized in that it includes means for sending a state notification intended for at least said second terminal and carrying a piece of information relating to the context in which a user of said first terminal is situated.

According to yet another hardware aspect, an embodiment of the invention also pertains to a computer program characterized in that it comprises program code instructions to implement a method as described further above when this program is executed by a processor.

BRIEF DESCRIPTION OF THE DRAWINGS

Other features and advantages shall appear more clearly from the following description of particular embodiments, given by way of simple illustrative and non-exhaustive examples and from the appended drawings, of which.

DETAILED DESCRIPTION OF ILLUSTRATIVE EMBODIMENTS

1. General Principle

The general principle of an embodiment of the invention relies on an exchange, between terminals associated with a same identifier, of state notifications carrying information on the context in which the users of the terminals are situated, enabling the users to know who is available for a conversation or to practice any other common activity.

In particular, when a communication is presented to the terminals, an embodiment of the invention provides for an exchange, between the terminals, of notifications of choice carrying a piece of information on the communication presented, so that the users are not left to themselves to choose whether or not to agree to be put into communication.

2. Description of One Embodiment

Figure 1:
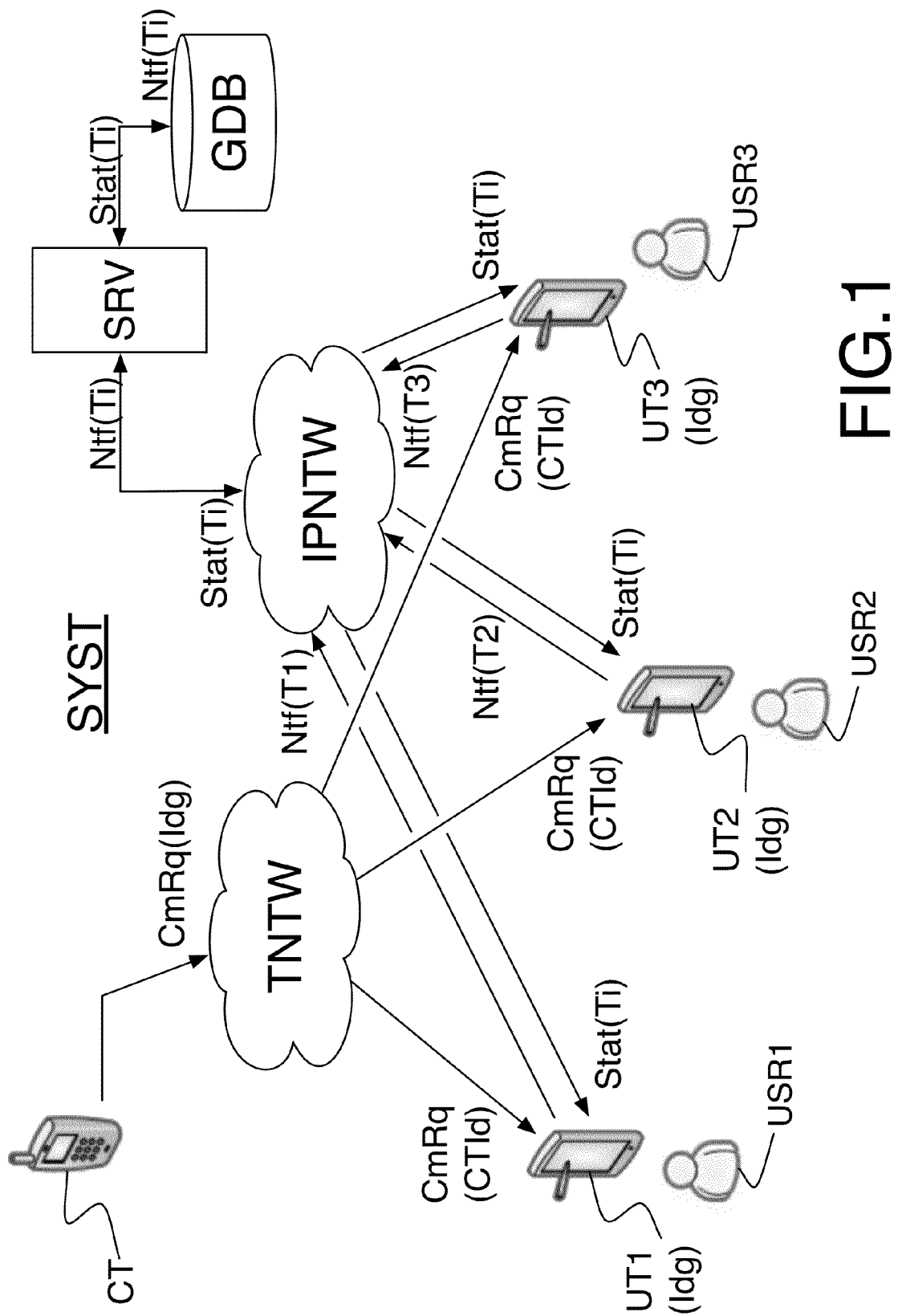
FIG. 1 is a functional diagram representing the communications system in which an embodiment of the invention is implemented.

FIG. 1 illustrates a mode of implementing an embodiment of the invention within a telecommunications system SYST including a first terminal, a second terminal and a third terminal UT1, UT2 and UT3 associated with a same group identifier Idg, for example a telephone number common to all these three terminals, each of said terminals ITi (for i=1 to 3 in this particular example) including means for sending state notifications Ntf(Ti) (for i=1 to 3) intended for the other terminals UTj (for i≠j) and carrying information on the context in which a user USRi of said terminal UTi (for i=1 to 3) is situated.

The system SYST according to an embodiment of the invention works as follows: each terminal UTi (for i=1 to 3) sends out a new state notification Ntf(Ti) as soon as a change takes place in its status or its context, for example if it is moved or enters into communication with a third party, or if it is in standby mode or on the contrary is reactivated, etc.

In the mode of implementation represented here, the state notifications Ntf(Ti) are transmitted via a data transfer network IPNTW, for example a network according to the Internet protocol, to a notification management server SRV whose purpose is to carry out centralized management of the pieces of state information coming from the terminals UTi (for i=1 to 3). To this end, the notifications management server SRV has a database of states GDB in which a table of states of the different terminals UTi (for i=1 to 3) is updated on the basis of state information contained in the state notifications Ntf(Ti).

At each updating of this table following the reception of a new state notification, a status notification Stat (Ti) describing the states of the different terminals UTi (for i=1 to 3) is generated by the database GDB and transferred to said terminals UTi by the notifications management server SRV through the data transfer network IPNTW.

Each terminal UTi (for i=1 to 3) can thus, almost in real time, render valid state information to its user USRi on each of the users of the other terminals Tj (for i≠j) that share its identifier Idg.

When a third-party terminal CT sends out a request for setting up a communication CmRq(Idg) intended for the group identifier Idg, this request for setting up a communication is transmitted via a telephone network TNTW, which in certain cases could be integrated into the data transfer network IPNTW to the terminals UTi (for i=1 to 3) in the form of a communication presentation signal CmRq(CTid) indicating the identifier CTId of the calling third-party terminal CT.

From the identifier of the caller terminal and the state information generated in real time or in almost real time through an embodiment of the invention, each user USRi of a terminal UTi (for i=1 to 3) can determine whether or not he wishes to be put into communication with the third-party terminal CT. Once his decision has been taken, a user USRi will cause his terminal UTi to send a particular type of state notification Ntf(Ti), in this case, a notification of choice, stipulating whether he is accepting or rejecting a setting up of a communication with the third-party terminal CT. This notification will processed in the same way as the state notifications already mentioned here above and will be passed on similarly to the other terminals UTj (for i≠j) by means of adapted status notifications Stat(Tj). In certain modes of implementation, the terminal UTi could itself be the addressee of a status notification concerning it so that this terminal will process its own status as that of the other terminals and produce therefrom the information corresponding to its own user. Thus, it will not be necessary, within a given terminal, to provide a particular circuit for processing the pieces of state information relating to this given terminal alone, all the state information relating to all terminals associated with the same group identifier being then processed in the same way by means of a single processing method.

Figure 2:
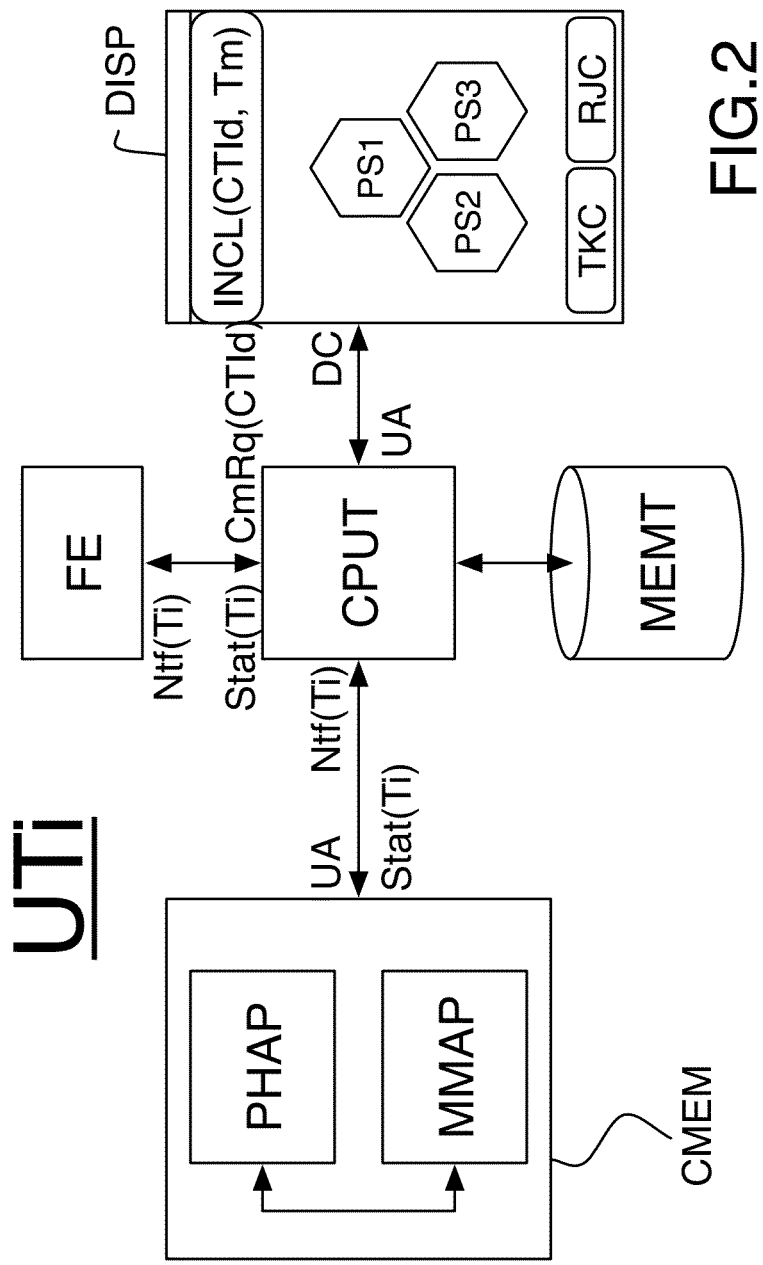
FIG. 2 is a functional diagram providing a schematic representation of a terminal included in such a communications system.

FIG. 2 illustrates a particular embodiment of a terminal UTi according to the above description.

This terminal UTi includes a central processing unit CPUT, for example based on a microprocessor, connected to a mass storage unit MEMT and a cache memory CMEM in which there have been memorized two applications initially stored in the mass storage unit MEMT. The central processing unit CPUT is furthermore connected to a screen DISP whose purpose is to achieve the real-time display or almost real-time display of state information or information on choice proper to each member of the group to which the user of the terminal UTi belongs.

In the mode of implementation described here, a first application PHAP called a telephone application, has the purpose of managing the telephone communications of the terminal UTi with the rest of the telecommunications system described further above, while a second application MMAP, called a multimedia application, has the purpose of managing the state information proper to the terminal UTi as well as information proper to the other terminals associated with the identifier of the group with which the terminal UTi is associated. The telephone application PHAP and the multimedia application MMAP have the purpose of exchanging information with each other. In particular, when the terminal UTi enters into communication with another terminal, the telephone application PHAP will announce this to the multimedia application MMAP which will generate a corresponding state notification Ntf(Ti) which will be sent to the management server by sending/receiving means FE upon the command of the central processing unit CPUT.

In other embodiments, the telephone application PHAP and the multimedia application MMAP could be integrated into a single application. For example, when the telephone communications are made in VoIP (Voice over IP well known to those skilled in the art), the speech signals will be encoded in frames of packets in order to be transported to their intended recipient via a data transfer network, in which case the management of the telephone communications within the terminal UTi will be done by an application of the same type as the multimedia application MMAP so that these applications could easily be merged.

Conversely, any status notification Stat(Ti) received by the sending/receiving means FE of the terminal UTi will be transmitted by the central processing unit CPUT to the multimedia application MMAP which will generate a command signal DC ordering the screen DISP to modify the image that it displays to take account of new state information included in this status notification Stat(Ti) thus updating the content of icons PS1, PS2 and PS3 representing the status of the terminals associated with the group identifier with which the terminal UTi is associated.

Thus, as explained here above, when a request for setting up a communication is sent to the group identifier with which the terminal UTi is associated, a call presenting signal CmRq (CTId) indicating the identifier CTId of the caller is transmitted to the terminal UTi. This request is transmitted to the central processing unit CPUT through the sending/receiving means FE and the central processing unit CPUT then generates display command signals DC while the screen displays an image INCL(CTId, Tm) intended to inform the user of the terminal UTi that a request for setting up a communication, coming from a caller whose identifier is CLTId, has been received by the terminal UTi. Optionally, the INCL(CTId, Tm) could contain the indication of a duration Tm at the end of which the incoming communication will be transferred to a messaging service. The command signal DC sent by the central processing unit CPUT furthermore orders the screen DISP to display two icons TKC and RJC intended to enable the user of the terminal UTi to make clear his choice of accepting or refusing the call presented in the image defined by the signal INCL(CTId, Tm), for example by means of pressure by a finger if the screen is a touch screen or again by means of a stylus or a cursor in other embodiments of the screen DISP.

After action by the user on either one of the icons TKC and RJC, a corresponding action signal UA will be transmitted via the central processing unit CPUT to the telephone application PHAP and the multimedia application MMAP. If the icon TKC has been selected, the telephone application PHAP will engage the call taking process and inform the multimedia application that a notification reporting a notification of choice reporting acceptance of the communication must be sent to the management server. If on the contrary it is the icon TKC that is selected, the telephony application will not be brought into play and the multimedia application will send the management server a notification of choice reporting refusal of the communication.

Optionally, the screen DISP could be provided with means for detecting a designation by a user of the terminal UTi of another user corresponding to one of the icons PS1, PS2 and PS3, such a detection being possibly executed for example by means of a pressure of the finger if the screen is a touch screen or again by means of a stylus or a cursor in other embodiments of the screen DISP.

Such a designation will trigger the generation of an action signal UA prompting the generation by the multimedia application MMAP of a notification of choice which will then include a command intended to bring about the production, by the terminal of the designated user, of a predetermined stimulus when said notification is received by this terminal either directly or after it has been transferred to this terminal by the management server. This predetermined stimulus could for example be a vibration informing the designated user that he must accept the communication being presented.

An exemplary embodiment of the invention provides an improvement over the prior art by proposing a method that enables members of a community of users, identified by means of a single telephone number, to have contextual information available on the other members of the community at any time and especially at the precise instant when a request for setting up a communication is presented to them so that these users can, firstly, know who is available for a conversation or to perform any other common activity and, secondly, not be left to themselves to decide whether or not they should accept a connection.

Although the present disclosure has been described with reference to one or more examples, workers skilled in the art will recognize that changes may be made in form and detail without departing from the scope of the disclosure and/or the appended claims.

The invention claimed is:

1. A method for transmitting information between at least one first terminal and one second terminal from a plurality of terminals associated with a common identifier, wherein the method comprises:

sending, through at least said first terminal, a state notification configured for at least said second terminal and carrying a piece of information relating to a context in which a user of the first terminal is situated, at the reception of a request for setting up a communication, corresponding to said common identifier, presenting said request to said plurality of terminals and sending, by at least said first terminal to at least the second terminal, a notification of choice comprising:
  a piece of information relating to the request presented for setting up a communication, and
  a command designed to produce, in at least said second terminal of the plurality of terminals, a predetermined stimulus indicative of a designation, by the user of the first terminal, of the user of said second terminal, informing the user of said second terminal that the user of the second terminal must accept the communication being presented.

2. The method according to claim 1, wherein the method further includes receiving said notification by a management server and re-transmitting said notification towards at least the second terminal.

3. The method according to claim 1, wherein presenting the communication includes a presentation of a duration at the end of which said communication will be transferred to a messaging service.

4. A telecommunications system including:
  a plurality of terminals associated with a common identifier, wherein at least one first terminal includes means for sending a state notification configured for at least one second terminal and carrying a piece of information relating to a context in which a user of said first terminal is situated, and at least said first terminal includes means for sending a notification to at least said second terminal before a communication is accepted by any of the plurality of terminals, said notification being a carrier of a piece of information relating to a request for setting up a communication, corresponding to said common identifier and presented to said plurality of terminals, said notification further including a command designed to produce, in at least a second terminal of the plurality of terminals, a predetermined stimulus indicative of a designation, by the user of the first terminal, informing the user of said second terminal that the user of said second terminal must accept the communication being presented.

5. A telecommunications system associated with an identifier common to a plurality of terminals, wherein the system includes:
  a first terminal comprising means for sending a state notification configured for at least one second terminal of the plurality of terminals and carrying a piece of information relating to a context in which a user of said first terminal is situated, and
  the first terminal further comprising means for sending a notification of choice to at least one second terminal before a communication is accepted by any of the plurality of terminals, said notification of choice being a carrier of a piece of information relating to a request for setting up a communication, corresponding to said common identifier and presented to said plurality of terminals, said notification of choice also including a command intended for producing, in at least one second terminal, a predetermined stimulus indicative of a designation, by a user of said first terminal, informing the user of said second terminal that the user of said second terminal must accept the communication being presented.

6. A computer-readable hardware memory comprising a computer program stored thereon and comprising program code instructions to implement a method for transmitting information between at least one first terminal and one second terminal from a plurality of terminals associated with a common identifier, when this program is executed by a processor, wherein the method comprises:
  sending, through at least said first terminal, a state notification configured for at least said second terminal and carrying a piece of information relating to a context in which a user of the first terminal is situated, and
  at the reception of a request for setting up a communication, corresponding to said common identifier, presenting said request to said plurality of terminals and sending, by at least said first terminal to at least the second terminal, a notification of choice comprising:
  a piece of information relating to the request presented for setting up a communication, and
  a command designed to produce, in at least said second terminal of the plurality of terminals, a predetermined stimulus indicative of a designation, by the user of the first terminal, of the user of said second terminal, informing the user of said second terminal that the user of the second terminal must accept the communication being presented.

* * * * *